US009802465B1

(12) United States Patent
Fukushima et al.

(10) Patent No.: US 9,802,465 B1
(45) Date of Patent: Oct. 31, 2017

(54) VISOR ASSEMBLY FOR A VEHICLE

(71) Applicant: GM GLOBAL TECHNOLOGY OPERATIONS LLC, Detroit, MI (US)

(72) Inventors: Celso K. Fukushima, Santo Andre (BR); Fernando A. Siqueira, Sao Bernardo do Campo (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,545

(22) Filed: Jul. 18, 2016

(51) Int. Cl.
*B60J 3/02* (2006.01)

(52) U.S. Cl.
CPC ............ *B60J 3/0278* (2013.01); *B60J 3/026* (2013.01)

(58) Field of Classification Search
CPC ....... B60J 3/0278; B60J 3/0282; B60J 3/0204
USPC ................................. 296/97.5, 97.1
See application file for complete search history.

(56) References Cited

U.S. PATENT DOCUMENTS

| 4,273,277 | A | * | 6/1981 | Stone | B60R 7/088 206/387.15 |
| 4,984,137 | A | * | 1/1991 | Maemura | B60J 3/0282 296/97.2 |
| 5,004,138 | A | * | 4/1991 | Gabas | A61L 9/12 224/312 |
| 5,364,153 | A | * | 11/1994 | Vaxelaire | B60R 7/05 296/37.1 |
| 5,813,717 | A | * | 9/1998 | Wilson | B60J 3/0282 296/97.5 |
| 6,543,832 | B1 | * | 4/2003 | Bogdanski | B60J 3/0208 296/97.1 |
| 9,150,157 | B1 | * | 10/2015 | Pendlebury | B60R 1/008 |
| 2004/0011835 | A1 | * | 1/2004 | Kim | B60J 3/0204 224/312 |
| 2007/0176459 | A1 | * | 8/2007 | Morris | B60R 7/05 296/97.5 |
| 2017/0008381 | A1 | * | 1/2017 | Huelke | B60J 3/0282 |

* cited by examiner

*Primary Examiner* — Jason S Morrow
(74) *Attorney, Agent, or Firm* — Quinn IP Law

(57) ABSTRACT

A visor assembly for a vehicle includes a visor housing including a first side and a second side spaced apart from and cooperating with the first side to define an outer periphery having an opening extending through the first and second sides of the visor housing and an inner periphery having at least one receiving surface cooperating with the opening. At least one support is disposed in the inner periphery of the visor housing and cooperating with the at least one receiving surface. A cover panel having an elongate body received is within the channel and movable relative to the at least support between at least a first position at least partially covering the opening and a second position. A biasing member selectively positions the cover panel in the second position.

18 Claims, 3 Drawing Sheets

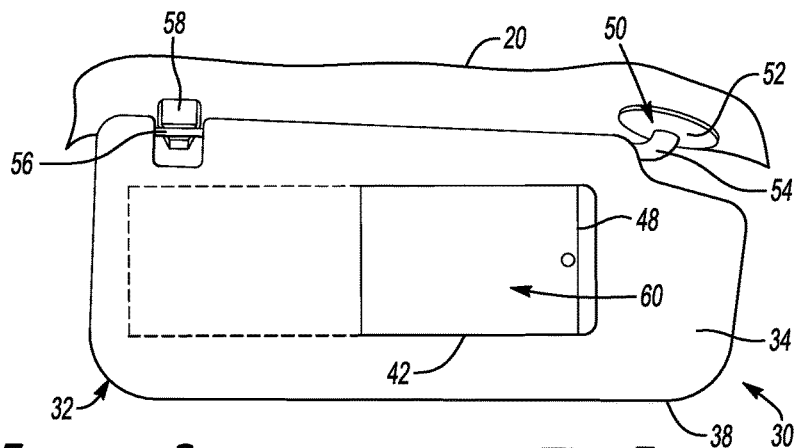
*Fig-3*
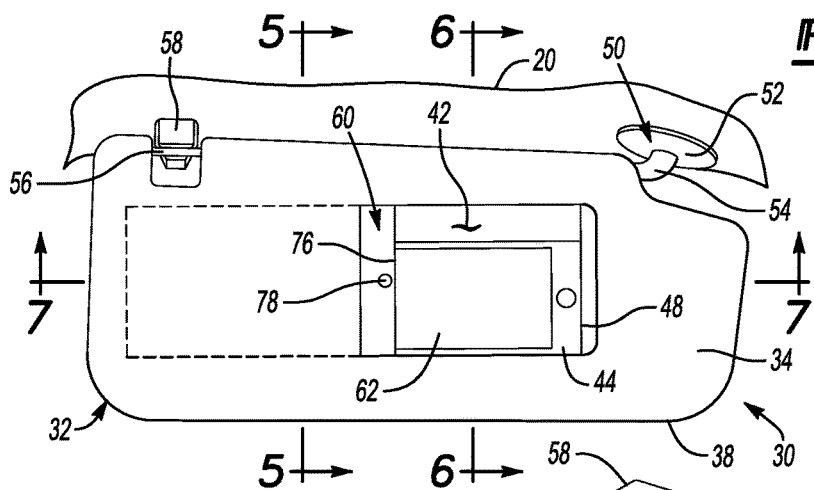
*Fig-4*
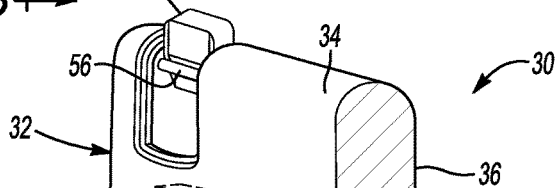
*Fig-5*
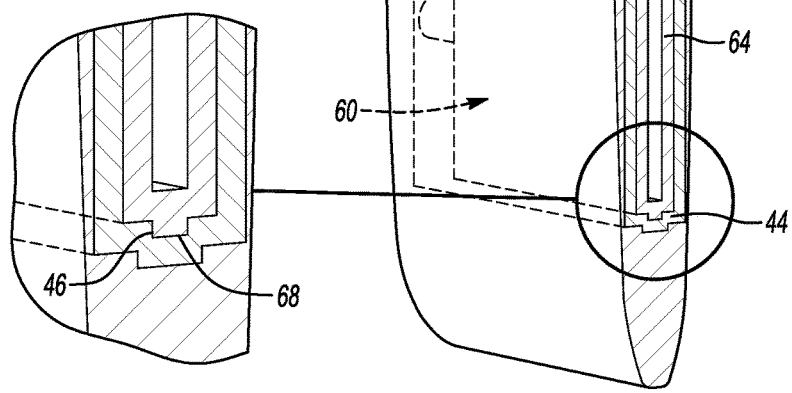

VISOR ASSEMBLY FOR A VEHICLE

TECHNICAL FIELD

The present disclosure relates to a visor assembly for a vehicle, and more particularly, to a visor assembly to removably secure an electronic device therein.

BACKGROUND

Many vehicles are equipped with one or more sun visors for use by passengers in the vehicle passenger compartment. The sun visors are generally disposed adjacent a vehicle windshield or one or more side windows to block some of the light entering the passenger compartment through the windshield and side windows. Some sun visors can be lowered over part of the windshield by the driver or front passenger to block the sun, and some may be swung sideways to block sun entering the driver and passenger side windows.

SUMMARY

A visor assembly for a vehicle includes a visor housing including a first side and a second side spaced apart from and cooperating with the first side. The first and second sides of the visor housing define an outer periphery having an opening extending through the first and second sides of the visor housing and an inner periphery having at least one receiving surface cooperating with the opening. At least one support is disposed in the inner periphery of the visor housing and cooperates with the at least one receiving surface.

A cover panel having an elongate body is received within the inner periphery of the visor housing and is movable relative to the at least support between at least a first position at least partially covering the opening and a second position. A biasing member is provided between the cover panel and the inner periphery of the visor housing to selectively position the cover panel in the second position. The at least one support is configured to receive at least one item between the cover panel and the at least one receiving surface when the cover panel is placed in the second position.

The at least one support of the channel includes a first support surface and an opposing second support surface, wherein at least one of the first and second support surfaces receives the at least one item positioned in the opening. At least one groove is formed in and extends longitudinally through at least one of the first and second support surfaces. The first and second support surfaces each include a groove at least partially formed therein to cooperate with at least one projection extending from the cover panel to align the cover panel in the channel.

The elongate body of the cover panel includes a first surface that cooperates with the biasing member and an opposing second surface including a portion defined to releasably engage the at least one item. A handle portion extending from the elongate body of the cover panel. The visor assembly includes an elongate arm having a first end adjustably connected to the vehicle and a second end adjustably connected to the visor housing, wherein the visor housing is rotatable about the second end between a retracted position and an extended position. The outer periphery of the visor housing is at least partially enclosed by fabric.

In another embodiment of the disclosure, a visor assembly for a vehicle includes a visor housing including a first side and a second side spaced apart from and cooperating with the first side. The first and second sides of the visor housing define an outer periphery having an opening extending through the first and second sides of the visor housing and an inner periphery having at least one receiving surface cooperating with the opening. An elongate arm includes a first end adjustably connected to the vehicle and a second end adjustably connected to the visor housing. The visor housing is rotatable about the second end of the elongate arm between a retracted position and an extended position.

At least one support is disposed in the inner periphery of the visor housing and cooperates with the at least one receiving surface. A cover panel having an elongate body is received within the inner periphery of the visor housing and is movable relative to the at least support between at least a first position at least partially covering the opening and a second position. A biasing member is provided between the cover panel and the inner periphery of the visor housing to selectively position the cover panel in the second position. The at least one support is configured to receive at least one item between the cover panel and the at least one receiving surface when the cover panel is placed in the second position.

The at least one support of the channel includes a first support surface and an opposing second support surface, wherein at least one of the first and second support surfaces receives the at least one item positioned in the opening. At least one groove is formed in and extends longitudinally through at least one of the first and second support surfaces.

The first and second support surfaces each include a groove at least partially formed therein to cooperate with at least one projection extending from the cover panel to align the cover panel in the channel. The elongate body of the cover panel includes a first surface that cooperates with the biasing member and an opposing second surface including a portion defined to releasably engage the at least one item. A handle portion extends from the elongate body of the cover panel.

In yet another embodiment of the disclosure, a vehicle includes a passenger compartment and a visor assembly coupled to the passenger compartment and rotatable between a retracted position and an extended position. The visor assembly includes a visor housing including a first side and a second side spaced apart from and cooperating with the first side. The first and second sides of the visor housing define an outer periphery having an opening extending through the first and second sides of the visor housing and an inner periphery having at least one receiving surface cooperating with the opening.

An elongate arm includes a first end adjustably connected to the vehicle and a second end adjustably connected to the visor housing. The visor housing is rotatable about the second end of the elongate arm between a retracted position and an extended position. At least one support is disposed in the inner periphery of the visor housing and cooperates with the at least one receiving surface.

A cover panel having an elongate body is received within the inner periphery of the visor housing and is movable relative to the at least support between at least a first position at least partially covering the opening and a second position. A biasing member is provided between the cover panel and the inner periphery of the visor housing to selectively position the cover panel in the second position. The at least one support is configured to receive at least one item between the cover panel and the at least one receiving surface when the cover panel is placed in the second position.

The at least one support of the channel includes a first support surface and an opposing second support surface, wherein at least one of the first and second support surfaces receives the at least one item positioned in the opening. At least one groove is formed in and extends longitudinally through at least one of the first and second support surfaces.

The first and second support surfaces each include a groove at least partially formed therein to cooperate with at least one projection extending from the cover panel to align the cover panel in the channel. The elongate body of the cover panel includes a first surface that cooperates with the biasing member and an opposing second surface including a portion defined to releasably engage the at least one item. A handle portion extends from the elongate body of the cover panel.

The above features and advantages, and other features and advantages, of the present disclosure are readily apparent from the following detailed description of some of the best modes and other embodiments for carrying out the disclosure, as defined in the appended claims, when taken in connection with the accompanying drawings.

BRIEF DESCRIPTION OF THE DRAWINGS

FIG. 3 is a front plan view of the visor assembly including an adjustable cover panel in a first position;

FIG. 4 is a front plan view of the adjustable cover panel in a second position within the visor assembly configured to receive at least one item therein;

FIG. 5 is a side cross-sectional perspective view of the visor assembly along line 5-5 of FIG. 4;

DETAILED DESCRIPTION

Figure 1:
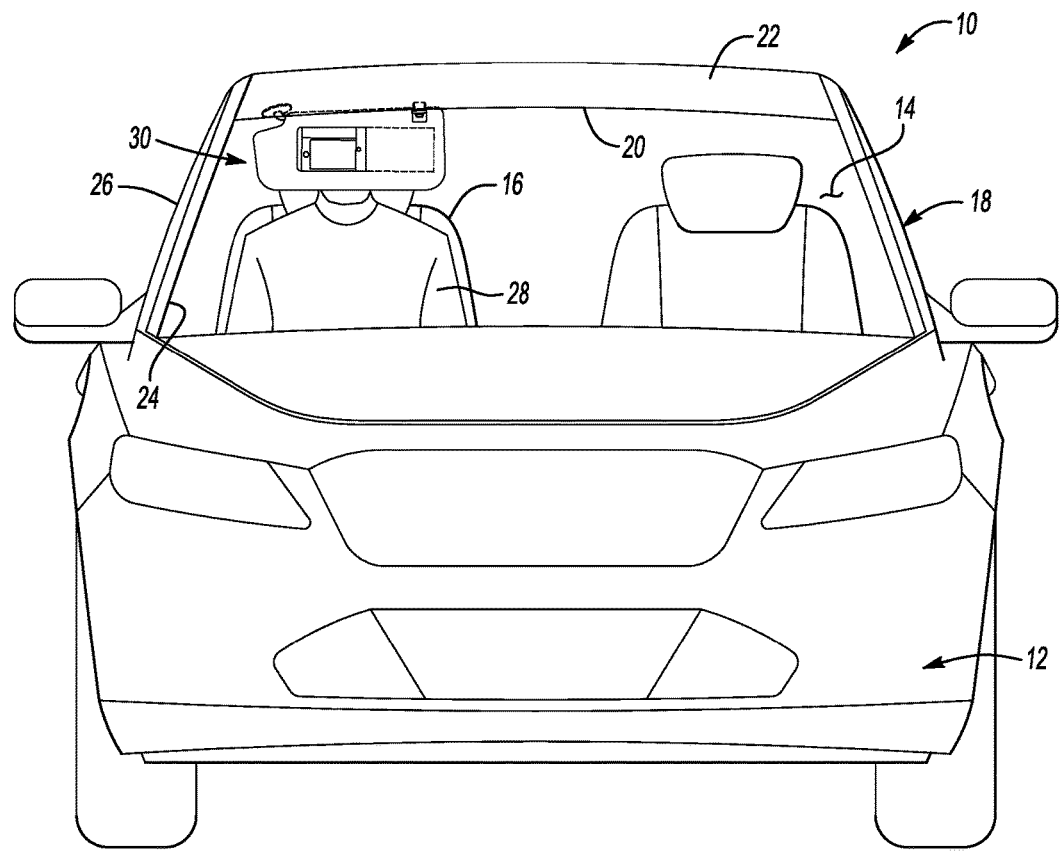
FIG. 1 is a perspective view of a portion of a passenger compartment of a vehicle.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a visor assembly 30 may be disposed. It is understood that the vehicle may be any mobile platform, such as an airplane, all-terrain vehicle (ATV), boat, personal movement device, robot and the like to accomplish the purposes of this disclosure.

It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10. FIG. 1 shows a vehicle 10 having a vehicle body 12 defining an interior or passenger compartment 14. The passenger compartment 14 may include one or more seating assemblies 16. Seating assemblies 16 may be configured to receive and support at least one user 28, such as a driver and/or one or more passengers to enter and exit the passenger compartment 14 through a portal receiving a door 18 or the like.

The passenger compartment 14 may include a headliner 20 securable to a roof 22 of the vehicle body 12. A windshield or front screen 24 may be disposed in the vehicle body 12 adjacent the roof 22 and passenger compartment 14. The vehicle 10 may also include one or more side windows 26 received within the door 18. Windshield 24 and one or more side windows 26 allow the user 28 in the passenger compartment 14 to view the environment surrounding the vehicle 10.

Figure 2:
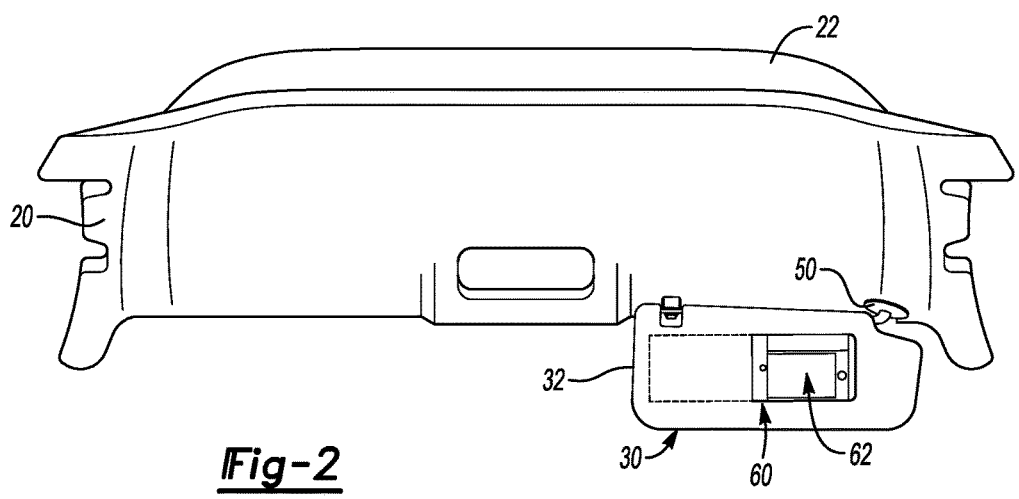
FIG. 2 is a perspective view of a visor assembly disposed on a headliner of the vehicle passenger compartment.

Referring additionally to FIGS. 2 and 3, the visor assembly 30 may be disposed adjacent to and adjustably positioned to the headliner 20 relative to a front seating assembly 16 of the passenger compartment 14. As is best shown in FIGS. 5-8, visor assembly 30 includes a visor housing 32 including a first side or sidewall 34, and a second side or sidewall 36 disposed opposite the first side 34. First side 34 and second side 36 cooperate to define an outer periphery of the visor housing 32, generally referenced by numeral 38, and a corresponding inner periphery 40 of the visor housing 32. The visor housing 32 may be formed in a generally elongated rectangular shape, though it is understood that a variety of shapes or geometries may be used to accomplish the objectives of the disclosure. Visor assembly 30 is adapted to be coupled to the headliner 20 by an arm 50 as will be described in greater detail.

Figure 6:
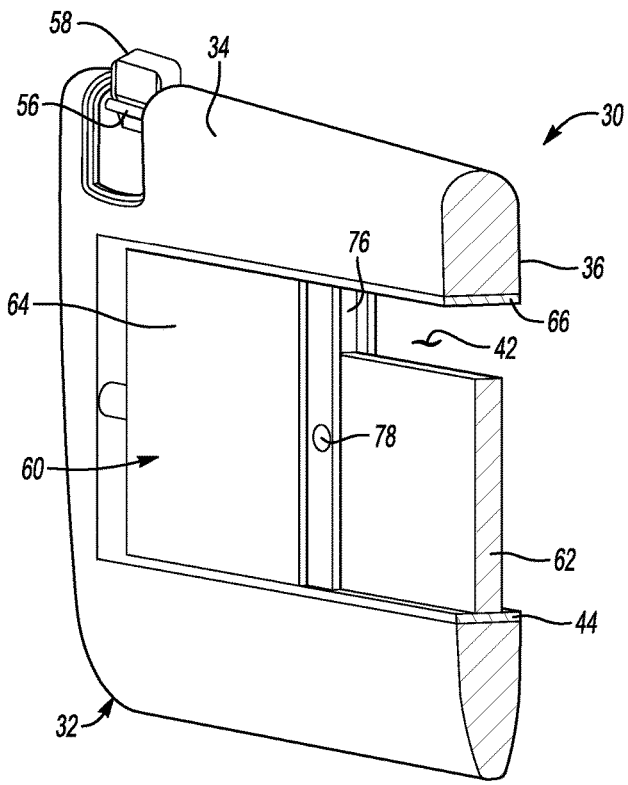
FIG. 6 is a side cross-sectional perspective view of the visor assembly along line 6-6 of FIG. 4.

Visor housing 32 may be formed of a polymeric material, such as polyurethane or the like. The outer periphery 38 may be at least partially enclosed with a covering material, such as fabric, leather or the like. The outer periphery 38 of the visor housing 32 may be configured to define an opening 42 in at least one of the first side 34 and second side 36 of the visor housing 32. As is shown in FIG. 6, in one embodiment of the disclosure, openings 42 are formed in each of the first and second sides 34, 36 of the visor housing 32 and are configured to align with each other and cooperate with the inner periphery 40 of the visor housing 32.

The inner periphery 40 of the visor housing 32 may include a channel or the like extending through the inner periphery of the visor housing 32. The inner periphery 40 includes at least one support 44 that cooperates with at least one receiving surface 48 formed in the inner periphery 40 of the visor housing 32. It is contemplated that the at least one support 44 provided therein is disposed adjacent a horizontal portion of the opening 42 while the at least one receiving surface 48 may be disposed adjacent a vertical portion of the opening 42. The at least one support 44 may be a support surface formed into the inner periphery of the visor housing 32 or may be a structure or assembly that is received within the inner periphery of the visor housing 32 that is configured to cooperate with opening 42.

At least one groove 46, as shown in FIG. 5, cooperates with the at least one support 44 and extends generally longitudinally in the at least one support 44. As will be described in greater detail below, the at least one groove 46 receives and cooperates with a cover panel 60 to guide the cover panel 60 through the inner periphery 40 of the visor housing 32.

Referring now to FIGS. 1-4, an elongate arm 50 may be adjustably mounted to the visor housing 32 of the visor assembly 30. The visor assembly 30 may be rotatable and extendable about the arm 50 between a retracted position (not shown) and an extended position as shown in FIGS. 1-4. In certain embodiments, the visor assembly 30 may be coupled to a headliner 20 of the passenger compartment 14. For example, the visor assembly 30 in a retracted position may be disposed adjacent the headliner 20 when folded away from the windshield 24 or one of the side windows 26 when the visor assembly 30 is not being used by the user and is being stored.

The visor assembly 30 may be placed in the extended position when the visor housing 32 is adjusted to overlap the windshield 24 and/or one of the side windows 26. In other words, the visor assembly 30 is in the extended position when a distal edge of the visor housing 32 is spaced from the headliner 20 to be deployed by the user 28. The arm 50 extending from the visor assembly 30 may be adjustably connected to the headliner 20 by a mounting portion 52.

In one embodiment of the disclosure, the arm 50 may include an elongated section receiving and supporting the visor housing 32 that terminates at one end at an elbow or curved portion 54 that is disposed adjacent the mounting portion 52. The arm 50 may rotate about the mounting portion 52 to move the visor assembly 30 from a position adjacent the windshield 24 to a position alongside one of the side windows 26 of the vehicle 10.

Visor assembly 30 may include a locking feature 56 configured to cooperate with and be secured to a mating feature 58 disposed on the headliner 20. Locking feature 56 may include a recessed clip feature provided on the visor housing 32 and be disposed opposite the elbow 54 of the arm 50. It is contemplated that the mating feature 58 may be a clip or other structure disposed on the headliner 20 to releasably engage the locking feature 56 on visor housing 32 to removably secure the visor assembly 30 adjacent the headliner 20 of the passenger compartment 14.

Referring now to FIGS. 4-8, the cover panel 60 is provided in the visor housing 32 of visor assembly 30. The cover panel 60 may be configured to releasably engage at least one item 62 within the inner periphery 40 adjacent the at least one opening 42 in the outer periphery 38 of the visor housing 32. In one embodiment of the disclosure, the at least one item 62 may be an electronic device from a non-limiting group of devices including a mobile phone, personal digital assistant, tablet, camera, video recording device, computing device and the like.

The cover panel 60 is selectively positionable in visor housing 32 in at least a first position as shown in FIG. 3, wherein the cover panel 60 extends through the inner periphery 40 such that the cover panel 60 at least partially covers the opening 42 in the visor housing 32 and a second position in the visor housing 32. In the second position as best shown in FIG. 4, the cover panel 60 is moved through inner periphery 40 to expose opening 42 to receive the at least one item 62 therein.

Figure 7:
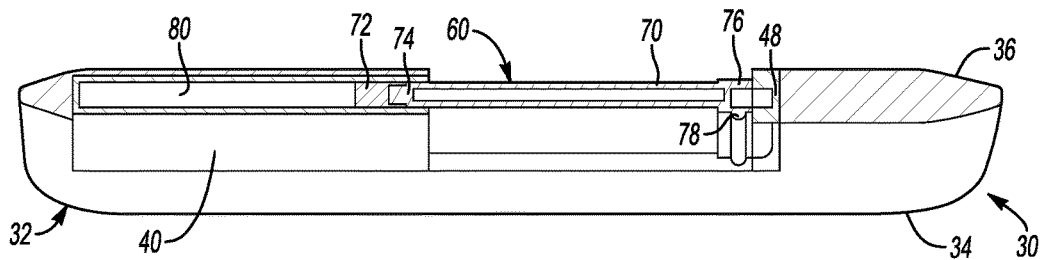
FIG. 7 is a bottom cross-sectional perspective view of the visor assembly in a first position along line 7-7 of FIG. 4.

Referring now to FIG. 7, a description of the selective positioning of the cover panel 60 in the visor assembly 30 is illustrated and described in greater detail. FIG. 7 illustrates the visor assembly with the cover panel 60 placed in the first position. In this first position, the cover panel 60 includes an elongate body 64 that is received by the at least one support 44 in the inner periphery 40. As is shown in FIG. 5, the at least one support 44 may include a first support surface 44 and an opposing second support surface 66. Each of the first and second support surfaces 44, 66 include a groove 46 at least partially formed therein and extending longitudinally through the surfaces 44, 66.

The elongate body 64 of the cover panel 60 includes at least one projection 68 extending from the body 64 that cooperates with the at least one groove 46. It is contemplated that the at least one projection 68 is sized to be received within the at least one groove 46 to align and guide the cover panel 60 for travel along the support surfaces 44, 66 within the inner periphery 40. The elongate body 64 further includes a first surface 70 that cooperates with a biasing member 72.

Biasing member 72 may be a spring, elastomer or the like that is provided on the first side surface 70 to releasably engage a portion of the inner periphery 40 of the visor housing 32. Alternatively, biasing member 72 may be disposed on a portion of the inner periphery 40 to releasably engage the first side surface 70 of the body 64.

A second surface 74 of the cover panel 60 is provided on an opposing surface of the elongate body 64 from the first surface 70. Second surface 74 may include a portion 76 defined to engage and support the at least one item 62. Alternatively, as shown in FIG. 3, portion 76 may be positioned adjacent the at least one receiving surface 48 of the inner periphery 40 in the visor housing 32 when the cover panel 60 is positioned in the first position. The cover panel 60 may further include a handle portion 78 cooperating with the elongate body 64 to provide a gripping surface for user adjustment of the cover panel 60 within the visor housing 32.

Figure 8:
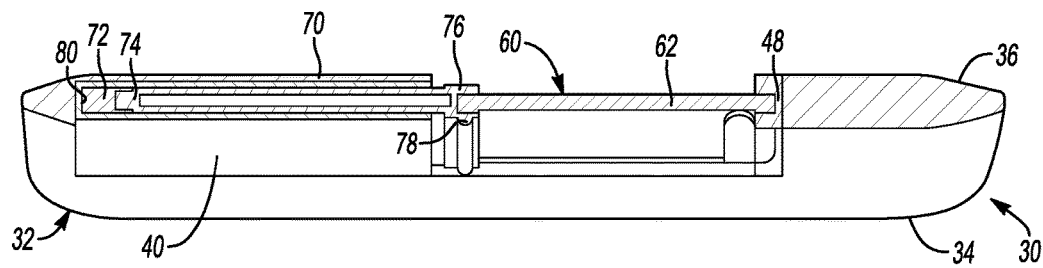
FIG. 8 is a bottom cross-sectional perspective view of the visor assembly in a first position along line 7-7 of FIG. 4.

Referring now to FIGS. 4, 6 and 8, a description of the movement of the cover panel 60 from at least the first position to the second position is described in greater detail. Cover panel 60 is translated through the inner periphery 40 in the visor housing 32 from the first position to at least one second position, wherein the cover panel 60 is moved to expose the openings 42 in the visor housing 32. As illustrated in FIG. 8, the elongate body 64 of the cover panel 60 may be received within a slot 80 provided in the inner periphery 40. Biasing member 72, disposed on the first surface 70 of the elongate body 64, engages a portion of the inner periphery 40 to limit travel of the cover panel 60 into the slot 80 and through the inner periphery 40.

In another embodiment of the disclosure, biasing member 72 may be sized to provide resistance to the travel of the elongate body 64 such that when the at least one item 62 is placed in the opening 42, the portion 76 on the second surface 74 of the cover panel 60 cooperates with the at least one receiving surface 48 of the inner periphery 40 to releasably engage the at least one item 62 and secure the item 62 in the opening 42 of the visor housing 32.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A visor assembly for a vehicle comprising:
a visor housing including a first side and a second side spaced apart from and cooperating with the first side to define an outer periphery having an opening extending through the first and second sides of the visor housing and an inner periphery having at least one receiving surface cooperating with the opening;
at least one support disposed in the inner periphery of the visor housing and cooperating with the at least one receiving surface, the at least one support including a first support surface and an opposing second support surface disposed on the inner periphery of the housing;
at least one groove formed in and extending longitudinally through at least one of the first and second support surfaces;
a cover panel having an elongate body received within the inner periphery and movable relative to the at least one support between at least a first position at least partially covering the opening and a second position; and
a biasing member provided between the cover panel and the inner periphery of the visor housing to selectively position the cover panel in the second position,
wherein at least one of the first and second support surfaces of the at least one support is configured to receive at least one item between the cover panel and the at least one receiving surface when the cover panel is placed in the second position.

2. The visor assembly of claim 1 wherein the first and second support surfaces each include a groove at least partially formed therein to cooperate with at least one projection extending from the cover panel to align the cover panel in the channel.

3. The visor assembly of claim 1 wherein the elongate body of the cover panel includes a first surface that cooperates with the biasing member and an opposing second surface including a portion defined to releasably engage the at least one item.

4. The visor assembly of claim 1 further comprising a handle portion extending from the elongate body of the cover panel.

5. The visor assembly of claim 1 wherein the visor assembly further comprises an elongate arm having a first end adjustably connectable to the vehicle and a second end adjustably connected to the visor housing, wherein the visor housing is rotatable about the second end between a retracted position and an extended position.

6. The visor assembly of claim 1 wherein the outer periphery of the visor housing is at least partially enclosed by fabric.

7. A visor assembly for a vehicle comprising:
a visor housing including a first side and a second side spaced apart from and cooperating with the first side to define an outer periphery having an opening extending through the first and second sides of the visor housing and an inner periphery having at least one receiving surface cooperating with the opening;
an elongate arm having a first end adjustably connected to the vehicle and a second end adjustably connected to the visor housing, wherein the visor housing is rotatable about the second end between a retracted position and an extended position;
at least one support disposed in the inner periphery of the visor housing and cooperating with the at least one receiving surface, the at least one support including a first support surface and an opposing second support surface disposed on the inner periphery of the housing;
at least one groove formed in and extending longitudinally through at least one of the first and second support surfaces;
a cover panel having an elongate body received within the inner periphery and movable relative to the at least one support between at least a first position at least partially covering the opening and a second position; and
a biasing member provided between the cover panel and the inner periphery of the visor housing to selectively position the cover panel in the second position,
wherein at least one of the first and second support surfaces of the at least one support is configured to receive at least one item between the cover panel and the at least one receiving surface when the cover panel is placed in the second position.

8. The visor assembly of claim 7 wherein the first and second support surfaces each include a groove at least partially formed therein to cooperate with at least one projection extending from the cover panel to align the cover panel in the channel.

9. The visor assembly of claim 7 wherein the elongate body of the cover panel includes a first surface that cooperates with the biasing member and an opposing second surface including a portion defined to releasably engage the at least one item.

10. The visor assembly of claim 7 further comprising a handle portion extending from the elongate body of the cover panel.

11. A vehicle comprising:
a passenger compartment; and
a visor assembly coupled to the passenger compartment and rotatable between a retracted position and an extended position, the visor assembly comprising:
a visor housing including a first side and a second side spaced apart from and cooperating with the first side to define an outer periphery having an opening extending through the first and second sides of the visor housing and an inner periphery having at least one receiving surface cooperating with the opening;
an elongate arm having a first end adjustably connected to the vehicle and a second end adjustably connected to the visor housing, wherein the visor housing is rotatable about the second end between a retracted position and an extended position;
at least one support disposed in the inner periphery of the visor housing and cooperating with the at least one receiving surface, the at least one support including a first support surface and an opposing second support surface disposed in the inner periphery of the housing;
at least one groove formed in and extending longitudinally through at least one of the first and second support surfaces;
a cover panel having an elongate body received within the inner periphery and movable relative to the at least one support between at least a first position at least partially covering the opening and a second position; and a biasing member provided between the cover panel and the inner periphery of the visor housing to selectively position the cover panel in the second position, wherein at least one of the first and second support surfaces of the at least one support is configured to receive at least one item between the cover panel and the at least one receiving surface when the cover panel is placed in the second position.

12. The vehicle of claim 11 wherein the first and second support surfaces each include a groove at least partially formed therein to cooperate with at least one projection extending from the cover panel to align the cover panel in the channel.

13. The vehicle of claim 11 wherein the elongate body of the cover panel includes a first surface that cooperates with the biasing member and an opposing second surface including a portion defined to releasably engage the at least one item.

14. The vehicle of claim 11 further comprising a handle portion extending from the elongate body of the cover panel.

15. The visor assembly of claim 7 wherein the visor assembly further comprises an elongate arm having a first end adjustably connectable to the vehicle and a second end adjustably connected to the visor housing, wherein the visor housing is rotatable about the second end between a retracted position and an extended position.

16. The visor assembly of claim 7 wherein the outer periphery of the visor housing is at least partially enclosed by fabric.

17. The vehicle of claim 11 wherein the visor assembly further comprises an elongate arm having a first end adjustably connectable to the vehicle and a second end adjustably connected to the visor housing, wherein the visor housing is rotatable about the second end between a retracted position and an extended position.

18. The vehicle of claim 11 wherein the outer periphery of the visor housing of the visor assembly is at least partially enclosed by fabric.

\* \* \* \* \*